R. DE FILIPPIS.
VARIABLE STEERING DEVICE FOR VEHICLES.
APPLICATION FILED MAR. 29, 1919.
1,332,545. Patented Mar. 2, 1920.
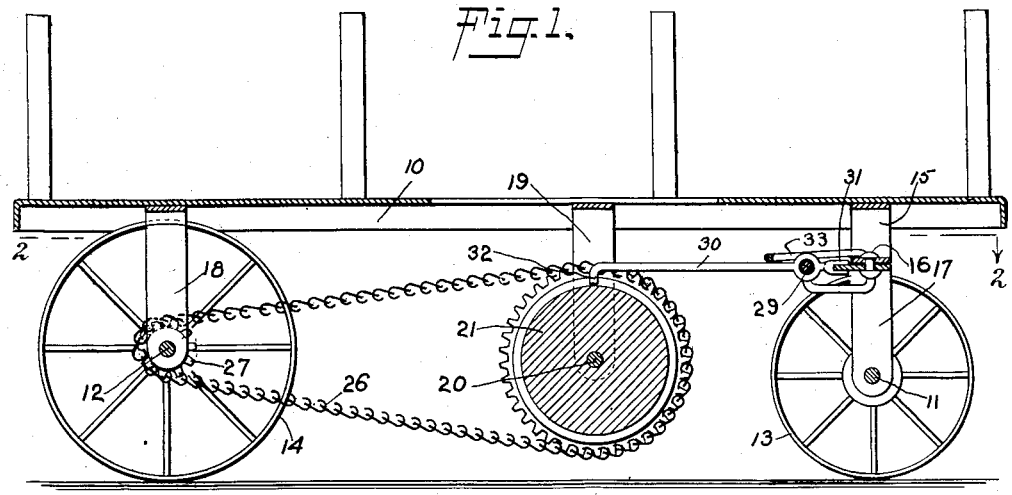
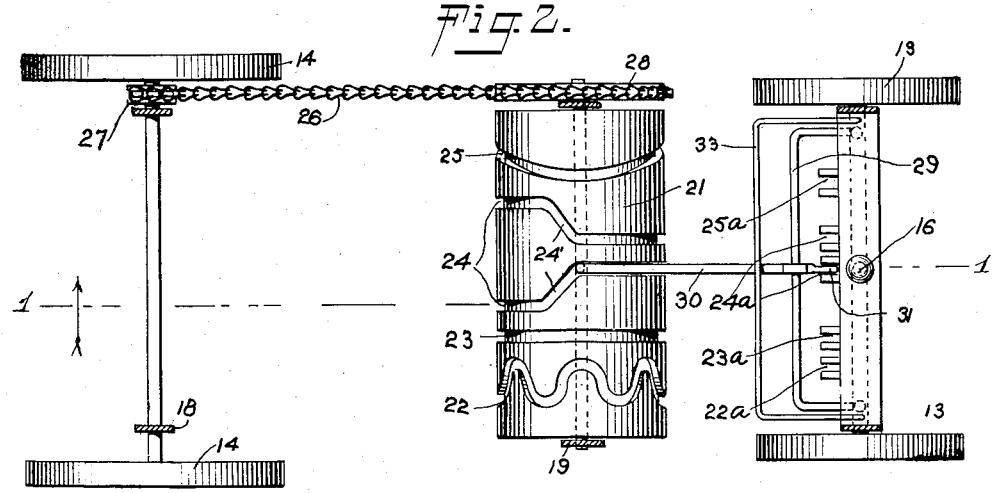
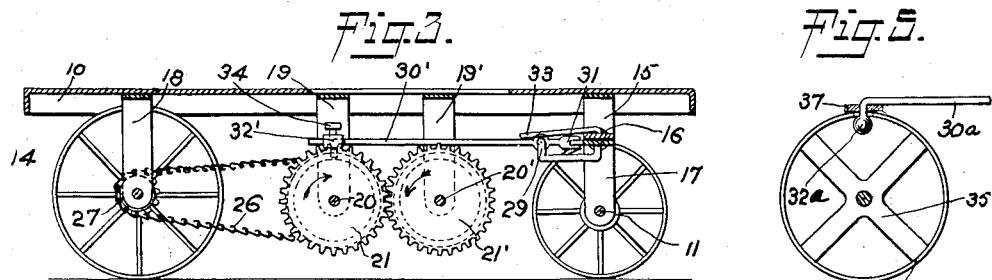
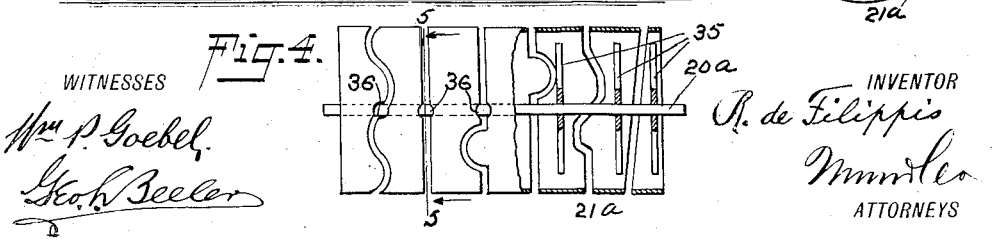
WITNESSES
INVENTOR
ATTORNEYS

UNITED STATES PATENT OFFICE.

RAYMOND DE FILIPPIS, OF BROOKLYN, NEW YORK.

VARIABLE-STEERING DEVICE FOR VEHICLES.

1,332,545.  Specification of Letters Patent.  Patented Mar. 2, 1920.

Application filed March 29, 1919. Serial No. 286,065.

*To all whom it may concern:*

Be it known that I, RAYMOND DE FILIPPIS, a citizen of the United States, and a resident of the city of New York, borough of Brooklyn, in the county of Kings and State of New York, have invented a new and Improved Variable-Steering Device for Vehicles, of which the following is a full, clear, and exact description.

This invention relates to toy vehicles, but certain features of the construction are adaptable for a wider field of usefulness.

Among the objects of the invention is to provide a toy vehicle or the like having means for automatically steering the same in lateral directions in any one of a variety of different actions.

More definitely stated the primary object of the invention is to provide a vehicle, one axle of which constituting the support for the steering wheels is mounted to swing around a vertical axis with respect to the main part of the vehicle and associated with said steering axle is an adjustable or variable steering connection with a member caused to rotate or operate continuously from the driving mechanism and through which the steering axle may be held from lateral turning or may be turned in either direction from the normal straight-away position according to the manner of adjustment of the steering connection.

Stated in more specific terms an object of the invention is to provide a steering drum, the same being mounted on a horizontal axis parallel to the rear axle of the vehicle and is driven from the rear axle through a low speed gear connection, said drum being provided on its periphery with a plurality of circular or cam grooves in any one of which a steering lever or the like may be selectively adjusted for the automatic steering of the front axle as a result of the rotation of the drum.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section on the line 1—1 of Fig. 2.

Fig. 2 is a horizontal section on the line 2—2 of Fig. 1.

Fig. 3 is a longitudinal section of a modification.

Fig. 4 is a plan view of a modified form of steering drum partly in section; and Fig. 5 is a vertical transverse section of the same on the line 5—5 indicating also the preferred form of steering lever in coöperation therewith.

Referring now more specifically to the drawings I show a vehicle having a frame or body 10 of any suitable design or construction supported upon front and rear axles 11 and 12 having front and rear wheels 13 and 14. The front part of the body is supported upon a bolster 15 having swiveled connection through a key bolt 16 with the front axle, or its yoke 17. While I do not wish to be limited to any specific construction in this respect it may be deemed preferable to provide a yoke 17 or bolster upwardly bowed and through the lower ends of which the axle 11 projects. The rear part of the body is supported upon a bolster 18 which like the front bolster 17 is upwardly bowed and through the lower ends of which a rear axle 12 projects.

Depending from the body at any convenient point between the front and rear trucks is a bracket 19, or its equivalent, in which is journaled around a horizontal axis 20 parallel to the rear axle 12 a drum 21 of any suitable construction generally speaking of cylindrical form, but having formed in or on its cylindrical surface a plurality of ribs, shoulders, or grooves of any suitable construction or form for the purposes of the invention. These grooves are indicated in Fig. 2 as five in number and which may be specifically described as follows: First the groove 22 is sinuous being composed of a continuous succession of bends or convolutions. The groove 23 is circular, the grooves 24 are each composed of a plurality of circular arcs in different planes connected by diagonal grooves 24', and finally the groove 25 is approximately elliptical and lies in a plane arranged at an oblique angle to the axis of the drum.

26 indicates a sprocket chain which may typify any suitable means for driving the drum preferably at a low speed and in a continuous motion from any suitable source of power such as a rear axle upon which is mounted a sprocket pinion 27, while arranged at one end of the drum shaft is a large sprocket gear 28. Assuming, therefore, that the vehicle is driven or propelled either by a motor or other means the rear axle due to the traction of the rear wheels will cause the rotation at a relatively low speed of the steering drum 21.

The connections between the steering drum and the steering truck or front axle may be described as follows: 29 indicates a bar parallel to and in substantially the same horizontal plane as the upper portion of the yoke or bolster 17 and lying preferably between said bolster and the steering drum. This bar is straight for a distance substantially equal to the grooved part of the drum. Secured to and projecting rearward from the upper flat portion of the bolster 17 are pairs of lugs 22ª, 23ª, 24ª and 25ª corresponding to the several grooves similarly numbered. That is to say for each groove of the drum there are provided lugs on the bolster approximately in the same vertical longitudinal plane as the groove.

A steering lever or tongue 30 is mounted upon the part 29 and is adjustable longitudinally of said bar so as to bring the point 30 of the tongue into position between the lugs of any pair while the rear end of the tongue is deflected downward as shown at 32 and consequently is adapted to ride or bear in any one of said grooves. The extreme end or point of the tongue may bear against the bottom of a groove and so limit the downward movement or thrust thereof. The lever or tongue 30 may be lifted or sprung upward, however, out of any groove so as to permit the longitudinal adjustment of the same along the bar 29 so as to bring the point 31 between the lugs of any other pair and the placing of the point 32 of the tongue into any other groove.

Any suitable means may be provided to retain the tongue in the operative position to which it may be adjusted. For this purpose I provide a keeper 33 in the form of a spring having its ends fixed in the bolster 15, while the intermediate or main portion thereof lies parallel to the bolster and on top of the tongue between its fulcrum 29 and the steering drum. To readjust the tongue, therefore, it is but necessary to lift upward upon the rear end thereof against the force of the keeper.

Assuming that the steering tongue 30 is located in the groove 23 and the corresponding pair of lugs 23ª and with the understanding also that the connection between the tongue 30 and the front steering axle is substantially rigid laterally, the point 32 of the steering tongue being located in the circular groove 23 will serve to hold the tongue in the same vertical plane as the groove 23 and this being perpendicular to the axle 11 will hold the vehicle to a straight course. If the tongue be adjusted along the bar 29 so as to bring its point 31 between the lugs of some other pair while the front axle is parallel to the rear axle and the point 32 of the tongue be dropped into some other groove than 23 there will be a variation in the steering due to the fact that the cam action of the drum 21 upon the tongue 30 will be to cause the tongue to swing laterally from the normal straight-away position according to the form of the groove. As shown in Fig. 2 the adjustment is such that the portion of the groove 24 that lies in the same plane as the space between the lugs 24ª will hold the vehicle to a straight course during a portion of the rotation of the drum and one of the lateral grooves 24' will cause a lateral deflection and a corresponding steering of the wheel from the straight-away course until the other arc-shaped portion of the groove is reached, when the front axle will be held for another period of time at a definite deflected position or angle, and when the other lateral groove 24' is reached in the same circuit the vehicle will be steered back again to its original position. With the adjustment of the tongue in the groove 22 there will be a continual right and left steering action given to the front axle although the general direction will be forward. The form of the groove 25 is such as to give a result somewhat similar to that of the grooves 24, but with more gradual turns or deflections.

Furthermore while it has been contemplated thus far that the steering tongue will be adjusted between any groove and the similarly indicated pair of lugs, it is possible for the tongue to be set into one of the grooves and for the point 31 thereof to be locked between some other pair of lugs. As for example the point 32 may be fitted in the annular groove 23, while the point 21 may be located between the lugs 22ª. To effect this adjustment the front axle obviously must be turned so as to bring the plane of the lugs 22ª in alinement with that portion of the groove 23 into which the hook 22 projects. The result, therefore, will be that the vehicle will be given a right turn and will so describe a circle, if not otherwise disturbed. Consequently it follows that a wide variety of results may be secured in all of the possible adjustments of the steering devices. Thus it will be seen that another of the many objects of the invention will be to teach a boy, for example, many of the fundamental principles of mechanics adding not only to his amusement but to his training along practical lines.

In Fig. 3 there are provided two steering drums 21 and 21' geared together on parallel axes 20 and 21' and suspended from brackets 19 and 19'. One of these drums is driven by any suitable means such as a sprocket chain such as described above and the other drum will be rotated constantly therefrom in the opposite direction. Both of these drums are adapted to be provided with grooves for coöperation with the tongue 30' or a lug 32' adjustable therealong and adapted to be locked in position as by means of a set screw 34. So far as steering the front axle is concerned it is immaterial as to the direction of rotation of the steering drum, but added amusement is afforded by the adaptability of the adjustment of the lug 32' for coöperation with either of the drums and when the lug 32' is adjusted for coöperation with either drum there is no interference or conflict between the steering devices and the other drum. The adjustments of the steering tongue with respect to the front axle is the same in this form of the invention as that above described.

In Figs. 4 and 5 I show a steering drum 21ª which may be made up of a multiplicity of cylindrical sections spaced from one another to provide the grooves. Each of these sections mounted upon a shaft 20ª by means of any suitable webs or spiders 35. The steering tongue 30ª adapted for coöperation with this form of the drum is shown provided with a head or knob 32ª adapted to be projected radially inward through an enlargement 36 in any one of the grooves or slots in the drum. Consequently the head or knob will prevent the withdrawal of the steering tongue from the steering drum except when the head registers with the enlargement 36. To prevent the shank portion of the tongue from dropping into any part of the groove I may provide a disk 37 which is larger in diameter than the opening and which consequently is adapted to ride upon the outer surface of the drum.

I claim:

1. In a vehicle of the class set forth, the combination with front and rear axles, means connected to the axles and a body support upon the wheels and axles, of steering devices associated with one of the axles and comprising a drum, means to rotate the drum from the other axle, the drum having contact means extending therearound, and a tongue connected to the steering axle and having rigid connection therewith with respect to lateral movements, said tongue having a member coöperating with said contact means whereby the position of the engaging end of the tongue with the contact means will determine the direction of steering of the vehicle.

2. In a vehicle, the combination with a body, front and rear axles and front and rear wheels connected to the axles, one of said axles constituting a steering axle while the other has fixed relation to the body, of automatic steering means including a drum supported below the body and rotatable around an axis parallel to the fixed axle, means to drive the drum from said axle, said drum having formed on its surface a plurality of contact means of different forms, a tongue adjustable laterally along and adapted to have fixed engagement with the steering axle but being rigid therewith after being adjusted, said tongue having at its opposite end a member adapted to selectively engage with any one of the contact members of the steering drum, the form of the contact device of the steering drum with which the tongue has engagement determining the direction of automatic steering of the vehicle.

3. The herein described automatic steering means for vehicles, the same comprising a steering axle, a bar having rigid engagement therewith and parallel to the axle, a steering drum spaced from the steering axle, means to rotate the drum and a steering tongue mounted upon and adjustable along said bar and having one end adapted to be engaged with the steering drum to determine the lateral position thereof with respect to the drum, and means coöperating with the other end of the tongue to hold the same rigid with respect to the steering axle.

4. In a steering device for vehicles, the combination of a steering axle, a bar connected thereto and held substantially parallel to the axle, a rotatable steering member, means to rotate the same, said steering member having a contact device extending around its periphery, a steering tongue mounted upon said bar and movable around the axis thereof and also being adjustable longitudinally thereof, said tongue having at one end a device coöperating with the contact device aforesaid whereby the lateral action of the tongue is determined, and means coöperating with the other end of the tongue to make the tongue rigid in lateral directions with respect to the steering axle.

5. The herein described steering device for vehicles comprising a steering axle, a rotatable steering member, means to rotate the steering member, said member having on its periphery a contact device of variable form, a pivot member connected to the steering axle, the axis of the pivot member being parallel to the axle, a steering tongue pivoted on said pivot member for swinging movement in a plane perpendicular to the axle, the remote end of the tongue having engagement with the contact device aforesaid whereby the lateral position thereof is determined, means coöperating with the other end of the tongue to make the tongue rigid in lateral directions with respect to the steering axle, and a resilient member coöperating with the tongue holding the tongue in engagement with said contact device.

RAYMOND DE FILIPPIS.